Feb. 21, 1939. J. H. VAN UUM 2,147,779
SPRING CLIP DEVICE
Filed May 29, 1937

INVENTOR.
JOHN H. VAN UUM
BY
*John H. Van Uum*
HIS ATTORNEY.

Patented Feb. 21, 1939

2,147,779

UNITED STATES PATENT OFFICE 2,147,779

SPRING CLIP DEVICE

John H. Van Uum, Lakewood, Ohio

Application May 29, 1937, Serial No. 145,473

6 Claims. (Cl. 189—88)

This invention relates to a spring clip for securing a hollow member to an apertured supporting structure. For this purpose, it is desirable to provide spring clips which may be installed in the aperture of the support preparatory to the installation of the supported member on the clip. For example, in automobile body manufacture, the spring clips used for fastening bead trim to the body are installed first in apertures in the body and the bead trim laid thereon and then pressed firmly toward the body so as to cause the clips to snap into engagement within the trim member. This is usually accomplished by the workman laying the bead trim along the row of clips and then beginning at one end running his hand lengthwise of the trim so as to cause it to successively snap into engagement with each clip of the row. So long as the bead trim and the clips are accurately formed, no particular difficulty is encountered. However, in the usual processes of manufacture, slight variations occur both in the clip and in the bead trim, particularly in the latter. As examples of these variations, the gauge of material from which the trim is made sometimes varies slightly. Again, in the folding operation the flanges on the bead trim which are engaged by the clip are bent slightly out of their true position and sometimes the edges thereof are burred so that proper engagement of the trim with the clip is prevented. Obviously any such failure of operation is apt to result in so distorting the bead trim or the clip that the entire trim and the clip must be removed with a consequent loss of time and waste of material.

One of the principal objects of the present invention is to provide a clip for the purposes described which will automatically compensate for slight variations or irregularities in the clips, bead trim and the support itself.

A more specific object is to provide a clip which may be effectively and securely maintained in place on the supporting structure for receiving the trim member or other member to be supported and which will assure fastening of the trim member at both of its lateral limits by each clip when the trim is thus pressed into position on the support.

Other objects and advantages will become apparent from the following specification wherein reference is made to the drawing, in which.

Figures 1, 2, 3:
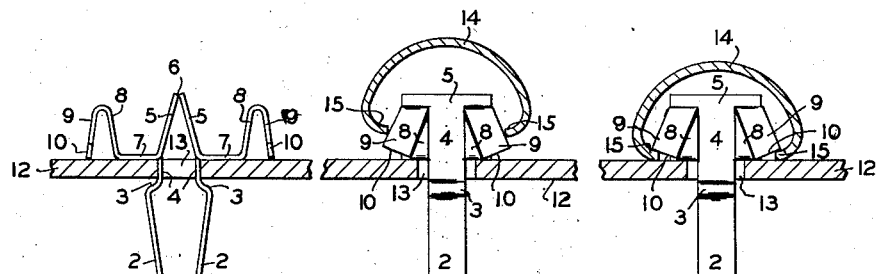
Fig. 1 is an end elevation of a preferred embodiment of the invention installed in a supporting structure.
Figs. 2 and 3 are side elevations of the clip illustrated in Fig. 1 and mounted in the supporting structure with the bead trim in different positions of installation thereon.
Figure 4:
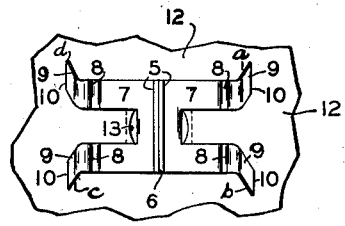
Fig. 4 is a plan view of the clip illustrated in Fig. 1.

Referring to Figs. 1 to 5, the clip there illustrated comprises a piece of resilient spring metal bent intermediate its ends to form a nose portion 1 with legs 2 divergent therefrom. Near their upper ends the leg portions 2 are provided with convergent portions forming locking shoulders 3 which are positioned to engage the under surface of the supporting structure when the clip is inserted through the aperture therein. The nose 1, legs 2 and shoulders 3 form the clip shank. Beyond the shoulders 3 are upwardly extending neck portions 4 which lie within the aperture of the support and which at their free end portions 5 are convergent upwardly and which are in abutting relation at their free upper edges, as indicated at 6. This structure forms, in effect, a closed loop for developing the full resilient effect of the spring metal in locking the clip into engagement with the supporting structure.

The portions 5 are of greater width than the legs 2 and neck portions 4, and this greater width of material is slit free from the legs and neck portions along their lateral edges and bent outwardly from the plane of the portions 5 to provide head portions 7. The head portions are positioned to lie against the outer surface of the support when the shoulders 3 are in engagement with the inner surface thereof adjacent the aperture. The free end portions of the head portions 7 are bent upwardly at substantially right angles to the plane of the head portions 7, as indicated at 8, and then downwardly, as indicated at 9. The terminal portions 9 also are twisted slightly so as to slope outwardly laterally of the head portions 7, as better illustrated in Figs. 2 and 4, thus providing locking arms. The end edges of the free ends of the arms 9, prior to bending them downwardly towards the support, lie at right angles to the remainder thereof so that when they are twisted outwardly, as described, the lower edges of the arms 9 are angularly disposed to the plane of the outer surface of the support and slope downwardly toward the outer surface of the support inwardly laterally of the head portions 7 to provide sloping trim locking shoulders 10 for engagement with the bead trim.

The clip is installed nose-foremost in the support 12 through the aperture 13 until the shoulders 3 snap into engagement with the inner surface of the support and the head portions 7 are juxtaposed on the outer surface of the support. In this position the clip is ready for the installation of a bead trim 14 having inturned flanges 15 for engagement with the shoulders 10. In the form illustrated, two such locking arms and shoulders are provided on each head portion. The locking arms on each head portion are preferably bent slightly differently with respect to each other so that the locking shoulders 10 thereof are positioned slightly different distances from the outer surfaces of the supporting structure. For example, in Fig. 4, the locking shoulders of the arm indicated at *a* may be spaced farther from the support than the locking shoulder of the arm indicated at *b*. The locking shoulder of the arm indicated at *c*, however, is spaced preferably the same distance as that indicated at *a*, while the shoulder of the arm indicated at *d* is preferably spaced the same as that indicated at *b*. Therefore, diagonally opposite arms have their locking shoulders spaced the same distance from the support though different from the other arm of the same head portion. The clip is positioned so that the head portions extend longitudinally of the bead trim and the bead trim is then placed thereon, as indicated in Fig. 2, and then pressed downwardly, as indicated in Fig. 3, until the flanges 15 thereof pass beneath and engage the shoulders 10 of the arms 9. During this movement the arms 9, portions 8 and the head portions 7 of each leg flex relatively toward each other edgewise and then reflex to secure the clip in place. Since they engage the clip edgewise, they tend to dig into the metal and firmly secure the clip in position.

Due to the equal spacing of the diagonally arranged locking shoulders and the difference in spacing of the locking shoulders of each head portion, at least one shoulder of each head portion engages the flanges 15 of the bead trim though in most cases all shoulders effect some engagement. Thus variations in the thickness of the trim and irregularities due to manufacture will not prevent proper installation.

Figure 5:
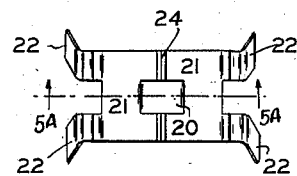
Fig. 5 is a modification thereof.

Referring next to Fig. 5, a similar clip is illustrated. In Fig. 5, however, the leg portions 20 are punched out of the flat metal strip so that the head portions 21 are relatively solid flat portions and only the end margins thereof are cut to provide arms 22, such as the arms 9 heretofore described. The clip illustrated in Fig. 5 will cooperate in a similar manner with the bead trim as the clip illustrated in Figs. 1 to 4.

In the modified form of the clip, suitable abutting portions 24 corresponding to the portions 5 above described are provided. In both forms of the clip, any upward pull on the arms 9 or arms 22 tends to cause pivotal action about the point of abutment of the portions 5 or 21, with a resultant tendency to separate the leg portions farther apart, thus effecting more firm engagement of the locking shoulders of the leg portions with the inner face of the support.

Figure 6:
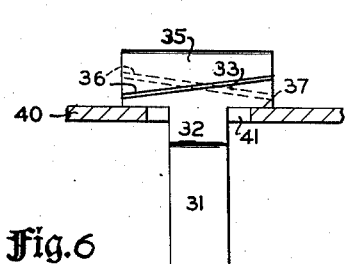
Fig. 6 is a side elevation of another modification of the clip illustrated in Fig. 1.
Figure 7:
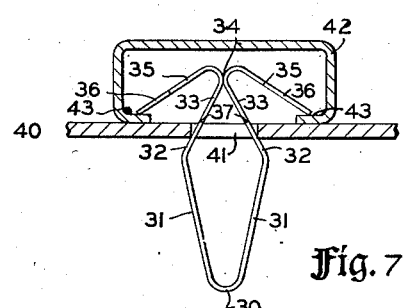
Fig. 7 is an end elevation of the clip illustrated in Fig. 6 in installed position for securing a bead trim member to a support, the trim member and support being shown in section for clearness in illustration.
Figure 5A:
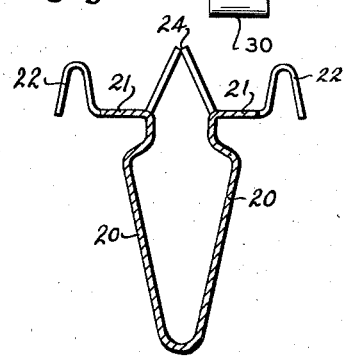
Fig. 5a is a cross sectional view of the clip illustrated in Fig. 5 and taken on a plane indicated by the line 5a—5a of Fig. 5.
Figure 8:
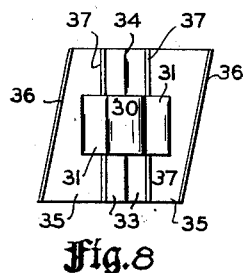
Fig. 8 is a plan view of the clip illustrated in Fig. 7.

Referring next to Figs. 6 to 8, inclusive, there is illustrated a clip for the same general purposes and formed from a single strip of spring metal. The clip illustrated in Figs. 6 to 8 includes a nose portion 30, which has an upright axis and a longitudinal axis. The clip has divergent leg portions 31 extending in the general direction of the upright axis of the nose, and has sloping locking shoulders 32 engageable with the inner face of a supporting structure adjacent the aperture therein. The shoulders 32 are elongated and convergent upwardly and terminate in neck portions 33 which abut at their upper ends as indicated at 34. The free ends of the strip beyond the neck portions 33 are then bent outwardly and downwardly to provide locking head portions or arms 35. The free margins of the arms 35 are cut on the bias so as to provide sloping locking shoulders 36 which are angularly disposed to the plane of the supporting structure when the clip is associated therewith, that is, to the plane which includes the longitudinal axis of the nose and is normal to the upright axis of the nose.

Due to the biased cutting of the free margins of the arms 35 and the manner of bending the same so that the lower edges extend at an angle to the plane of the support, the resultant shoulders or free ends 36 not only are angularly disposed to the plane of the outer surface of the support but extend on a bias to the lengthwise dimension of the bead trim to be associated with the clip. The neck portions 33 are of greater width than the leg portions 31 so as to provide landing shoulders 37. Consequently, the points on the free ends which are opposite to each other diagonally of the head are the same distance from the support, and the points which are directly opposite laterally of the head are different distances from the support.

The clip illustrated in Figs. 6 to 8 is installed in a supporting structure, indicated at 40, having an aperture 41 for receiving the clip nose-foremost. When fully installed, the shoulders 32 engage the inner surface of the support and the landing shoulders 37 rest on the outer surface of the support adjacent the aperture, thus positioning the clip in the supporting structure in firm locking engagement therewith. In this position, the locking shoulders 36 of the arms 35 are spaced above the outer surface of the support 40, the spacing being very slight adjacent the longer side of the arms and considerably greater at the shorter side, as better illustrated in Fig. 6. In this position a bead trim or other hollow member 42 having inturned flanges 43 is pressed onto the arms of the clip. Due to the slope of the arms 35, the arms are moved relatively together as the bead trim is pressed downwardly, thus permitting relative passage of the flanges 43 and the arms until the flanges 43 strike the support. In this position, part or all of the arms 35 are free from the flanges and spring outwardly so that part of the locking shoulders 36 will overlie some portion of the adjacent flange 43. The particular portion of the shoulder 36 which engages the flange is dependent upon the thickness of the flange or irregularity resulting from manufacture of the flange or clip. Since the arms 35 are comparatively wide and the shoulder 36 is fairly steeply sloped, a wide variation can be compensated for. Furthermore, differences in lateral dimensions of the bead trim are likewise compensated for due to the fact that the head portions and their free margins extend bias to the lengthwise dimension of the trim, that is, the free margins are angularly disposed to the lengthwise dimension of the trim as illustrated in Fig. 8. Thus the gripping relation between each head portion of the clip and the associated flange of the trim is assured at at least one point. In case of severe stress which might otherwise prevent a flange from passing beneath the shoulders 36, the clip may be rotated slightly by the resultant force about the axis of the aperture until it has changed the alignment of the head portions 35 with the bead trim and has finally accommodated itself in a locking position with respect to the trim.

Having thus described my invention, I claim:

1. In a combination including a hollow bead trim member, having inturned flanges defining an opening along one side, an apertured support, and a clip for securing the member to the support, said clip comprising a single strip of metal having a nose and shank portion arranged for reception in the aperture of the support nose foremost, and having head portions disposed for engaging the outer surface of the support in face to face relation when the clip is installed, said head portions each having free end portions angularly disposed to and extending in a direction generally away from the nose partway of their length and then in the opposite direction for the remainder of their length in the form of locking fingers, and said locking fingers terminating at their free ends in spaced relation to the outer surface of the support when the clip is installed, and having their ends sloping at an angle to the plane of the support.

2. In a combination including a hollow bead trim member, having inturned flanges defining an opening along one side, an apertured support, and a clip for securing the member to the support, said clip comprising a single strip of metal having a shank portion received in an aperture of a supporting member end-foremost, and having head portions for engaging the outer surface of the support in face to face relation when the clip is installed, said head portions each having free end portions angularly disposed to and extending in a direction generally away from the nose partway of their length and then in the opposite direction for the remainder of their length in the form of locking fingers, said locking fingers terminating at their free ends in spaced relation to the outer surface of the support when the clip is installed, and adjacent ones of said fingers being divergent downwardly edgewise.

3. In a combination including a hollow bead trim member having inturned flanges defining an opening along one side, an apertured support, and a clip for securing the member to the support, said clip comprising a single strip of metal having a portion in the form of a nose and portions extending therefrom in spaced relation and forming spaced legs, and received in an aperture of the supporting member nose-foremost, and neck portions extending from the free ends of the legs away from the nose, and having portions therebeyond in a direction away from the nose and convergent away from the nose and in abutting relation to each other at their free ends, and having head portions between said neck portions and convergent portions angularly disposed for engaging the outer surface of the support in face to face relation when the clip is installed, said head portions each having free end portions angularly disposed to and extending in a direction generally away from the nose partway of their length and then in the opposite direction for the remainder of their length in the form of locking fingers, and said locking fingers terminating at their free ends in spaced relation to the outer surface of the support when the clip is installed.

4. In a combination including a hollow bead trim member, having inturned flanges defining an opening along one side, an apertured support, and a clip for securing the member to the support, said clip comprising a single strip of metal having a portion in the form of a nose and portions extending therefrom in spaced relation and forming spaced legs, and neck portions extending from the free ends of the legs in a direction away from the nose, said clip being received in an aperture of a supporting member nose-foremost, and having portions beyond the neck portions and convergent away from the nose and in abutting relation to each other at their free ends, and having head portions between said neck portions and convergent portions angularly disposed thereto and engaging the outer surface of the support in face to face relation when the clip is installed, said head portions each having free end portions angularly disposed to and extending in a direction generally away from the nose partway of their length and then in the opposite direction for the remainder of their length and in the form of locking fingers, said locking fingers terminating at their free ends in spaced relation to the outer surface of the support when the clip is installed, and said fingers being divergent edgewise, in a direction toward the support.

5. In a combination including a hollow bead trim member, having inturned flanges defining an opening along one side, an apertured support, and a clip for securing the member to the support, said clip comprising a single strip of metal having a shank portion receivable in an aperture of the supporting member end-foremost, and having head portions in engagement with the outer surface of the support in face to face relation when the clip is installed, said head portions each having free end portions angularly disposed to and extending in a direction generally away from the nose partway of their length and then in the opposite direction for the remainder of their length in the form of locking fingers, said locking fingers terminating at their free ends in spaced relation to the outer surface of the support when the clip is installed, and said fingers being divergent downwardly edgewise and square at their free ends whereby the free ends are angularly disposed to the plane of said head members.

6. A clip for securing a hollow bead trim member having inturned flanges defining an opening along one side of the member, to an apertured support, at the outer surface of said support, and comprising a single strip of spring metal having a portion in the form of a nose and portions extending therefrom in spaced relation to each other and in the form of spaced legs which are arranged for reception through an aperture of the support for securing the clip to the support, and having spaced portions beyond the legs and which are convergent away from the nose and are in abutting relation to each other at their ends farthest from the nose, and having land portions arranged to engage the outer surface of the support when the clip is installed on the support, said clip having free end portions in the form of locking fingers terminating at their free ends so as to lie in such spaced relation to the outer surface of the support when the clip is installed on the support with the land portions in engagement with the outer surface of the support so as to accommodate flanges of the trim member between said free ends and the support, and said fingers being divergent toward the nose and having the terminal edges of their free ends angularly disposed to said outer surface of the support.

JOHN H. VAN UUM.